United States Patent Office 3,372,201
Patented Mar. 5, 1968

3,372,201
ALKOXYLATION OF SECONDARY ALCOHOLS
Robert E. Leary, Somerville, Louis J. Nehmsmann III, Warren, Leslie M. Schenck, Mountainside, and John M. Walts, Clark, N.J., assignors to General Aniline & Film Corporation, New York, N.Y., a corporation of Delaware
No Drawing. Filed June 17, 1966, Ser. No. 558,280
5 Claims. (Cl. 260—615)

This invention relates to a novel process of producing secondary alcohol polyalkylene glycol ethers by alkoxylation of secondary alcohols using an improved catalyst system.

The alkoxylation of secondary alcohols is well known in the art, for example, the basic reaction may be depicted as:

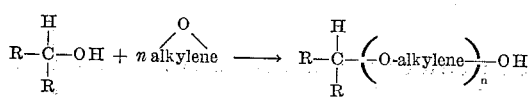

wherein R is an aliphatic radical either straight chained or branched, or an aryl radical and $n$ is a positive integer having an average value of from 1 to 150 and preferably from 1 to 15. It has also been proposed to utilize a number of alkaline and acid catalysts. For instance, it has been proposed to utilize boron trifluoride as the acid catalyst in alkoxylation reactions. However, alkoxylation of secondary alcohols is a rather sensitive reaction and the problem of undersirable side reactions occuring is by no means a small one. Secondary alcohols easily form coordination compounds with boron trifluoride which are very unstable and upon distillation they tend to split off boron fluoride dihydrate with the formation of olefins which contribute undesirable color to the reaction product. Moreover, such a dehydration side reaction produces water in the alkoxylation admixture, thereby resulting in undesirable glycol formation. Thus, the need for an improved process which not only results in an effective product, but which also prevents such side reactions has remained constant.

The principal object of this invention is to provide a process for producing secondary alcohol polyalkylene glycol ethers by alkoxylation of secondary alcohols using an improved catalyst system. A further object is to provide such a process that eliminates or at least minimizes undesirable side reactions. An additional object is to provide such a process that will eliminate undesirable color in the reaction product and also prevent glycol formation. Other objects of this invention will become readily apparent as this specification proceeds.

We have now discovered that the alkoxylation of secondary alcohols may be greatly improved and the above objects easily attained by the use of our novel process using an improved catalyst system.

More particularly, our invention is directed to the alkoxylation of secondary alcohols employing as a catalyst a boron trifluoride/phosphate complex, e.g., $BF_3 \cdot$ trialkylphosphate complexes or $BF_3 \cdot$ triarylphosphate complexes. These complexes not only catalyze the reaction, but also eliminate or substantially minimize undesirable side reactions, such as, the dehydration of the secondary alcohol reactant. By so doing, the formation of olefinic bodies has been eliminated, the polymerization of which contributes undesirable color to the reaction product. Furthermore, suppression of the dehydration side reaction eliminates water from being formed in the alkoxylation admixture, thereby minimizing simple and polyglycol formation.

Accordingly, any secondary alcohol may be used as the starting material in the present invention. Among the preferred secondary alcohols that may be used in our process are those alcohols having from 6 to 20 carbon atoms, among which the following are illustrative:

| | |
|---|---|
| 2-heptanol | 2,7-dimethyl-4-decanol |
| 3-heptanol | 2-butyl-4-octanol |
| 2-hexanol | 2,6,8-trimethyl-4-nonanol |
| 2-octanol | 3-ethyl-6-undecanol |
| 2-nonanol | 2-methyl-7-ethyl-4-undecanol |
| 3-nonanol | 3,9-diethyl-6-undecanol |
| 4-nonanol | 2-eicosanol |
| 5-nonanol | 3-eicosanol |
| 2-decanol | 4-eicosanol |
| 2-dodecanol | 5-eicosanol |
| 3-dodecanol | 6-eicosanol |
| 4-dodecanol | 7-eicosanol |
| 5-dodecanol | 8-eicosanol |
| 6-dodecanol | 9-eicosanol |
| 2-octadecanol | 10-eicosanol |
| 2-methyl-7-ethyl-4-nonanol | |

Moreover, instead of employing the individual secondary alcohols one may employ a mixture of the secondary alcohols having from 6 to 20 carbon atoms obtained by the sulfation of $\alpha$-olefins of from 6 to 20 carbon atoms with sulfuric acid followed by hydrolysis in accordance with the procedure of W. J. Hickinbottom, "Reactions of Organic Compounds," Longman, Green & Company, London 1948, page 14, or by the normal addition of hydrobromic acid in the dark with antioxidants to yield the 2-bromides in accordance with the procedure of Kharasch and Potts, "Org. Chem." 2,195 (1937) followed by hydrolysis.

Alpha-olefins in the carbon range of from $C_6$–$C_7$, $C_7$–$C_9$, $C_9$–$C_{11}$, $C_{11}$–$C_{15}$, and $C_{15}$–$C_{20}$ are commercially available and contain from 81 to 86 weight percent of straight chain $\alpha$-olefins, from <0.5 to 2 weight percent of straight chain internal olefins, from 13 to 3 weight percent of branched and naphthenic olefins, from 2 to 4 weight percent of paraffins and naphthenes and from 1 to <1 weight percent of aromatics, respectively. These $\alpha$-olefin compositions or blends of the entire range are ideally suited for the conversion into a mixture of secondary alcohols by sulfation and hydrolysis or conversion into 2-bromides followed by hydrolysis and the crude alcohol mixture distilled and employed directly in the ethoxylation of the first stage. One may also employ secondary alcohols prepared by the conventional oxidation of linear paraffins.

An example of the oxidation route is taught by the British patent, Ser. No. 939,534. In this disclosure, there is described a process for the oxidation of nonaromatic hydrocarbons to compounds containing oxygen, including alcohols, which comprises reacting a nonaromatic hydrocarbon with free oxygen or a gas containing free oxygen in the presence of a borate ester, the corresponding alcohol of which is more volatile under the reaction conditions than is the alcohol produced in the oxidation reaction. A comprehensive report discussing this important synthesis may be found in a paper entitled, "Synthesis of Higher Aliphatic Alcohols by Direct Oxidation of Paraffinic Hydrocarbons," by A. N. Bashkirov and V. V. Kamsolkin, and presented at the 5th World Petroleum Congress held in New York city during 1959. An earlier disclosure of this art is treated in U.S. patent 1,947,989.

The chlorination of paraffin hydrocarbons is discussed in length by Asinger, Geiseler and Schmiedel, "Chemische Berichte" 92 3085–3101 (1959). Hydrolysis of these hydrocarbon halides to the corresponding alcohols is disclosed in U.S. Patent 2,572,251. A further discussion of this route is given by F. Asinger, "Chemie und Technologie der Paraffin—Kohlenwasserstoffe," published by Akademie—Verlag, Berlin, 1959. Addition of HBr to olefins followed by hydrolysis to the corresponding secondary alcohol is discussed by Kharasch and Potts, "Org. Chem." 2, 195 (1937).

Any alkylene oxide may be used in the instant process, for example, ethylene oxide, propylene oxide, butylene oxide, styrene oxide and the like, as well as an admixture of ethylene oxide and propylene oxide, such as disclosed in copending application Ser. No. 538,971, filed Mar. 31, 1966, the more preferred being the lower alkylene oxides.

The $BF_3$/phosphate complexes, used as the catalyst of the instant invention, may be easily prepared, for example, by bubbling $BF_3$ through a trialkyl or a triarylphosphate from about 0° to about 30° C. The resultant complexes contain from about 1 percent to about 25 percent $BF_3$, and are used in catalytic quantities, usually in such amounts as to provide an amount of $BF_3$ in the range of 0.05% to 2.0% based on the weight of secondary alcohol to promote the alkoxylation of the secondary alcohols. It should also be understood that in addition to using a single complex catalyst one may use a mixture of two or more such catalysts if he so desires.

The temperature at which the instant reaction is carried out is not critical and may vary over a wide range depending upon such conditions as the starting material, desired product, etc., however, the preferred temperature lies in the range of about 30° to about 150° C. The process may be carried out continuously or discontinuously and under atmospheric to super atmospheric pressures.

The molar ratio of alcohol to oxide present in the instant invention is in no way critical and merely depends on the number of ether linkages one desires in the final product, which normally ranges from about 1 to 150. In the present invention it is preferred to utilize a mole to mole ratio of alcohol to oxide from 1 to 15, especially from 1 to 5, so as to produce anywhere from 1 to 5 ether linkages in the final product.

Any $BF_3$/organic phosphate ester complex is suitable for use as the catalyst in the present process. Said phosphate complexes are believed to have the formula:

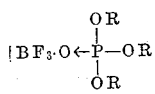

wherein R represents member selected from the group consisting of substituted and unsubstituted alkyl radicals as well as alkyl radicals and monocyclic aryl radicals. Moreover, the R radicals may be the same or different. Among the more preferred complexes are such $BF_3$/phosphates as:

$BF_3$/trimethylphosphate
$BF_3$/triethylphosphate
$BF_3$/tributylphosphate
$BF_3$/triphenylphosphate
$BF_3$/trioctylphenylphosphate
$BF_3$/tri-$\beta$-chloroethylphosphate and
$BF_3$/trilaurylphosphate.

Advantageous results may be obtained using widely varied ratios of $BF_3$/phosphate complexes.

Utility of the secondary alcohol polyalkylene glycol ethers produced by our invention is well known in the art, for example, they are very valuable nonionic surface active agents, as disclosed in U.S. Patent 2,870,220. They may also be used as intermediates for preparing numerous wetting agents and detergents, such as their sulfate esters.

The following examples are illustrative of the present invention and are not to be regarded as limitative. It is to be understood that all parts, percentages and proportions referred to herein and in the appended claims are by weight unless otherwise indicated.

*Example I*

A solution of $BF_3$·triethylphosphate complex catalyst (19.5% $BF_3$) was prepared by bubbling $BF_3$ gas through the triethylphosphate at 10° to 20° C. The temperature was maintained below 20° C. by external cooling.

5.4 grams of the above catalyst solution prepared above were added to 1050 grams (5.1 moles) of a mixture of $C_{12}$-$C_{15}$ linear secondary alcohols. VPC data showed the mixture to contain about 30% $C_{12}$ secondary alcohols, 20% $C_{13}$ secondary alcohols, 27% $C_{14}$ secondary alcohols, and 23% $C_{15}$ secondary alcohols. The mixture was heated to 80°–85° C. and 450 grams (10.2 moles) of ethylene oxide added over 2½ hours. Absorption of the ethylene oxide was rapid and external cooling was used to maintain the temperature in the range of 80–85° C. When the addition was complete, the reaction mixture was purged with nitrogen to remove any unreacted ethylene oxide and was made alkaline to litmus paper by the addition of monoethanolamine. The yield of secondary alcohol polyethylene glycol ethers, based quantitatively on the weight of the ethylene oxide added, was 65.7%. The unreacted alcohols, accounting for 31% of the reaction mixture, were removed by fractional distillation. The undesirable glycol content of the residue was found to be 3.3%.

The residue, a mixture of secondary alcohol polyethylene glycol ethers, was converted to the corresponding ammonium sulfate esters by reaction with sulfamic acid in the usual known fashion. Said sulfate esters exhibited very good utility as surface active wetting agents.

Similar results may be obtained when the above process is carried out using other mixed alcohols or separate secondary alcohols, such as dodecanol-2, dodecanol-3, n-secondary tetradecyl alcohols and the like, in place of the mixture of $C_{12}$ to $C_{15}$ secondary alcohols used in Example I. Likewise, similar results may be obtained when such oxides as propylene oxide, butylene oxide and styrene oxide as well as an admixture of ethylene oxide and propylene oxide such as disclosed in copending application, Ser. No. 538,971 filed Mar. 31, 1966, are substituted in place of ethylene oxide. Moreover, the number of ether linkages may be easily increased by increasing the mole ratio of oxide to alcohol.

*Example II*

A control experiment comparable to Example I was run except that only boron trifluoride was used for catalyzing the ethoxylation reaction.

A total of 900 grams (4.35 moles) of the same commercially available $C_{12}$ to $C_{15}$ secondary alcohols used in Example I containing 0.08% of boron trifluoride was heated to 80–85° C. and 383 grams (8.7 moles) of ethylene oxide added over a period of 1 hour using external cooling to maintain the temperature in the range of 80 to 85° C. When the addition was complete, the reaction mixture was purged with nitrogen to remove any unreacted ethylene oxide and made alkaline to litmus paper by the addition of monoethanol amine. The yield of secondary alcohol polyethylene glycol ethers, based quantitatively on the weight of the ethylene oxide added, was 61.5% and had an undesirable color. The unreacted alcohols, accounting for 32% of the reaction mixture, were removed by fractional distillation. The undesirable glycol content of the residue was found to be 6.5%

The residue, a mixture of secondary alcohol polyethylene glycol ethers, was converted to the corresponding ammonium sulfate esters by reacting with sulfamic acid in the usual known fashion. These sulfate esters did not exhibit as good utility as the surfactants produced in Example I.

Examples I and II aptly demonstrate the superiority of the instant improved process, as well as the unexpected results produced when the catalyst is a boron trifluoride·phosphate complex.

The following examples further serve to illustrate the activity of the instant catalyst system.

Example III

A solution of $BF_3 \cdot$ triethylphosphate complex catalyst (5% $BF_3$) was prepared according to the procedure described in Example I.

Operating as in Example I, two ethoxylation runs of the secondary alcohols were carried out at atmospheric pressure, one at 30 to 40° C., and the other at 80 to 90° C. Both reactions took place rapidly and virtually quantitatively in the presence of 2% of the above prepared $BF_3 \cdot$ triethylphosphate catalyst solution (0.1% $BF_3$). The yield of secondary alcohol polyethylene glycol ethers, based on the weight of the ethylene oxide added, was 69.70% for the run at the lower ethoxylation temperature and 66.71% for the run at the higher ethoxylation temperature. The unreacted alcohols, accounting for 27.03% of the reaction mixture of the first run and 30.07% of the reaction mixture of the second run, were removed by fractional distillation. The undesirable glycol content in the residue was 3.27% for the lower ethoxylation temperature and 3.30% for the higher ethoxylation temperature.

Similar results were obtained when the ethoxylation was carried out at 140–150° C. The ethoxylation may also be carried out in the presence of a solution of $BF_3 \cdot$ triethylphosphate (25% $BF_3$) with like results.

Example IV

Example I was repeated except that it was carried out in the presence of a catalytic amount of a 1% solution of $BF_3 \cdot$ triethylphosphate (0.05% $BF_3$). The yield of secondary alcohol polyethylene glycol ether, based quantitatively on the weight of the ethylene oxide added, was 69.20%. The unreacted alcohols, accounting for 27.03% of the reaction mixture, were removed by fractional distillation and the undesirable glycol content of the residue was found to be 2.79%.

Similar results were obtained by substituting various $BF_3$/phosphate complexes, such as $BF_3$/trimethylphosphate, $BF_3$/tributylphosphate, $BF_3$/triphenylphosphate, $BF_3$/trioctylphenylphosphate and $BF_3$/tri-$\beta$-chloroethylphosphate in for the $BF_3$/triethylphosphate complex used in Example IV.

Example V

Example IV was repeated using a catalytic amount of a 1% solution of $BF_3 \cdot$ trilaurylphosphate (0.5% $BF_3$) as the catalyst. The yield of secondary alcohol polyethylene glycol ethers, based qantitatively on the weight of the ethylene oxide added, was 69.10%. The unreacted alcohols, accounting for 28.45% of the reaction mixture, were removed by fractional distillation and the undesirable glycol content of the residue was found to be 2.45%.

Example VI

Example IV was repeated except that a catalytic amount of a 1% solution of $BF_3$ tri-p-nonylphenylphosphate (0.05% $BF_3$) was used as the catalyst. The yield of secondary alcohol polyethylene glycol ethers, based quantitatively on the weight of the ethylene oxide added, was 68.51%. The unreacted alcohols, accounting for 28.62% of the reaction mixture, were removed by fractional distillation and the undesirable glycol content of the residue was found to be 2.87%.

Example VII

As a control, Example IV was repeated except that a catalytic amount of a 1% solution of $BF_3$ alone was used as the catalyst. The yield of secondary alcohol polyethylene glycol ethers, based quantitatively on the weight of the ethylene oxide added, was 62.0%. The unreacted alcohols, accounting for 30.3% of the reaction mixture, were removed by fractional distillation and the undesirable glycol content of the residue was found to be 7.6%.

Various modifications and variations of this invention will be obvious to a worker skilled in the art and it is understood that such modifications and variations are to be included within the purview of this application and the spirit and scope of the appended claims.

We claim:

1. In a process for producing secondary alcohol polyalkylene glycol ethers, having from 1 to 5 ether linkages, by reacting a secondary alkanol having from 6 to 20 carbon atoms, with an alkylene oxide at a temperature of about 30° to about 150° C. in the presence of a catalytic amount of $BF_3$ catalyst; the improvement comprising employing as said catalyst a $BF_3$/trialkylphosphate complex wherein each alkyl contains about 1 to 12 carbon atoms or a $BF_3$/triarylphosphate complex wherein the aryl groups are monocyclic.

2. A process dependent upon claim 1, wherein the catalyst is a $BF_3$/triethylphosphate.

3. A process dependent upon claim 1, wherein the secondary alkanol starting material is a mixture of $C_{12}$ to $C_{15}$ secondary alkanols.

4. A process dependent upon claim 1, wherein the alkylene oxide is ethylene oxide.

5. A process dependent upon claim 1, wherein the $BF_3$/phosphate catalyst contains from about 1% to about 25% $BF_3$.

References Cited

UNITED STATES PATENTS

| | | |
|---|---|---|
| 2,293,868 | 8/1942 | Toussaint. |
| 2,355,823 | 8/1944 | Schlegel. |
| 2,870,220 | 1/1959 | Carter. |

LEON ZITVER, *Primary Examiner.*

H. T. MARS, *Assistant Examiner.*